United States Patent

Chen

[19]

[11] Patent Number: 6,011,384
[45] Date of Patent: Jan. 4, 2000

[54] VOLTAGE BALANCING DEVICE FOR A DIRECT CURRENT POWER SUPPLYING SYSTEM

[75] Inventor: Sheng-Feng Chen, Tao-Yuan Hsien, Taiwan

[73] Assignee: Quanta Computer Inc., Tao-Yuan Hsian, Taiwan

[21] Appl. No.: 09/205,540

[22] Filed: Dec. 3, 1998

[30] Foreign Application Priority Data

Dec. 4, 1997 [TW] Taiwan .................................. 86220229

[51] Int. Cl.[7] ....................................................... G05F 1/40
[52] U.S. Cl. ............................................... 323/273; 307/77
[58] Field of Search ..................................... 323/268, 270,
323/273, 275, 303; 307/43, 52, 77

[56] References Cited

U.S. PATENT DOCUMENTS

| | | | |
|---|---|---|---|
| 3,571,604 | 3/1971 | Porta et al. | 307/24 |
| 3,651,333 | 3/1972 | Goldberg et al. | 307/130 |
| 4,358,688 | 11/1982 | Tamii | 307/77 |
| 4,670,667 | 6/1987 | Petit | 323/311 |
| 5,675,239 | 10/1997 | Kim et al. | 323/273 |
| 5,801,518 | 9/1998 | Ozaki et al. | 323/222 |

*Primary Examiner*—Adolf Deneke Berhane
*Attorney, Agent, or Firm*—Renner, Otto, Boisselle & Sklar, P.L.L.

[57] ABSTRACT

A voltage balancing device is to be used in a dc power supplying system which includes first and second power supplying units that are connected in series to supply power concurrently operate an electrical load. The first power supplying unit has a negative terminal and a positive terminal to be connected to the electrical load. The second power supplying unit has a positive terminal connected to the negative terminal of the first power supplying unit, and a negative terminal to be connected to a ground. The voltage balancing device includes a reference voltage generating unit connected in parallel to the power supplying system and having an output that provides a reference voltage, and a comparator unit having a first input port connected to the output of the reference voltage generating unit, a second input port connected to a junction of the first and second power supplying units of the power supplying system so as to receive a detected voltage therefrom, and an output port connected to the second input port.

8 Claims, 2 Drawing Sheets

6,011,384

VOLTAGE BALANCING DEVICE FOR A DIRECT CURRENT POWER SUPPLYING SYSTEM

BACKGROUND OF THE INVENTION

1. Field of the Invention

The invention relates to a direct current (dc) power supplying system, more particularly to a voltage balancing device that permits voltage outputs of two or more power supplying units of the power supplying system to become balanced so as to extend the service life of the power supplying units.

2. Description of the Related Art

Conventional electronic devices, such as mobile telephones and notebook computers, require a rechargeable battery pack which can supply electric power to the electronic devices. The rechargeable battery pack generally includes at least two rechargeable batteries, such as lithium battery, connected in series. Each of the batteries has different internal leakage current and generates a different voltage output after a period of time so as to reduce the capacity of the rechargeable battery pack. After a long period of use, the difference between the output voltages of the batteries increases, and the output voltages of the batteries can not become balanced. The result is that the batteries can not be used even after being fully charged. For example, assuming that two lithium batteries A, B are connected in series, and that output voltages of the lithium batteries A, B are 3 volts and 2.5 volts, respectively, after a period of time due to the generation of leakage current. Usually, a lithium battery is fully charged at 4.2 volts and is fully discharged at 2.5 volts. When the lithium batteries A, B are charged until the output voltage of the lithium battery A is 4.2 volts, the output voltage of the lithium battery B is at most 4 volts. When the discrepancy between the output voltages of the lithium batteries A, B becomes larger, repeated charging of the batteries A, B will eventually result in failure of the same.

SUMMARY OF THE INVENTION

Therefore, the main object of the present invention is to provide a voltage balancing device that permits voltage outputs of two or more power supplying units of a dc power supplying system to become balanced so as to extend the service life of the power supplying units.

Accordingly, the voltage balancing device of the present invention is adapted for use in a power supplying system which includes at least first and second power supplying units that are connected in series to supply power concurrently to operate an electrical load. The first power supplying unit has a negative terminal and a positive terminal to be connected to the electrical load. The second power supplying unit has a positive terminal connected to the negative terminal of the first power supplying unit, and a negative terminal to be connected to a ground. The voltage balancing device comprises a reference voltage generating unit and a comparator unit.

The reference voltage generating unit is adapted to be connected in parallel to the power supplying system and has an output that provides a reference voltage.

The comparator unit has a first input port connected to the output of the reference voltage generating unit, a second input port adapted to be connected to a junction of the first and second power supplying units of the power supplying system so as to receive a detected voltage therefrom, and an output port.

The comparator unit includes comparator means for comparing the reference voltage and the detected voltage, and path means adapted to connect the junction of the first and second power supplying units to the second input port. The path means further connects the output port to the second input port.

The comparator unit is adapted to allow the second power supplying unit to discharge via the path means upon detection by the comparator means that the reference voltage is less than the detected voltage until the reference voltage and the detected voltage become equal, indicating a condition in that voltage outputs of the first and second power supplying units have become balanced.

The comparator means is adapted to supply discharge current to the first power supplying unit via the path means so as to be adapted to allow the second power supplying unit to discharge slower than the first power supplying unit upon detection by the comparator means that the reference voltage is greater than the detected voltage until the reference voltage and the detected voltage become equal, indicating the condition in that the voltage outputs of the first and second power supplying units have become balanced.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
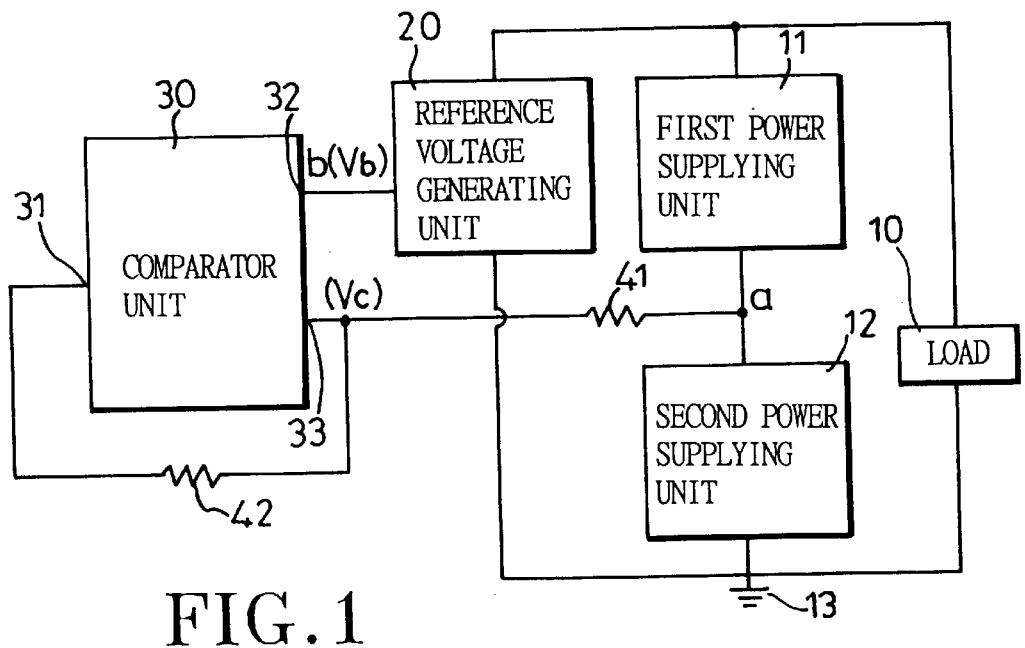
FIG. 1 is a schematic circuit block diagram illustrating a power supplying system that incorporates the first preferred embodiment of a voltage balancing device according to the present invention.
Figure 2:
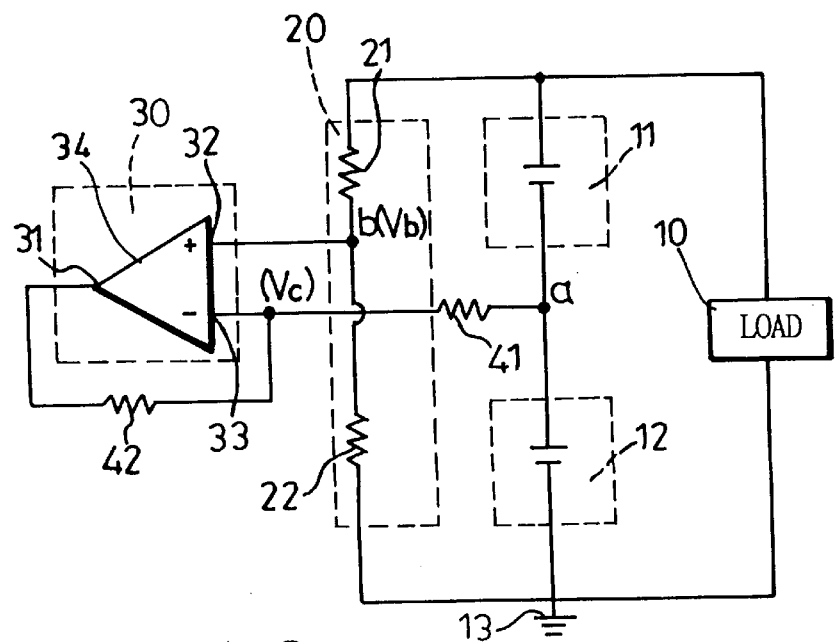
FIG. 2 is a schematic electrical circuit diagram illustrating a power supplying system that incorporates the first preferred embodiment of a voltage balancing device according to the present invention.

Referring to FIGS. 1 and 2, the first preferred embodiment of a voltage balancing device according to the present invention is shown to be installed in a dc power supplying system that provides power to an electrical load 10, such as a notebook computer or a mobile telephone. The power supplying system includes first and second power supplying units 11, 12, such as lithium rechargeable batteries, that are connected in series to supply power concurrently to operate an electrical load 10. The first power supplying unit 11 has a negative terminal and a positive terminal to be connected to the electrical load 10. The second power supplying unit 12 has a positive terminal connected to the negative terminal of the first power supplying unit 11, and a negative terminal to be connected to a ground 13. The voltage balancing device comprises a reference voltage generating unit 20 and a comparator unit 30.

The reference voltage generating unit 20 is adapted to be connected in parallel to the power supplying system and has an output (b) that provides a reference voltage (Vb). The reference voltage generating unit 20 includes first and second resistors 21, 22 connected in series across the power supplying system. The first and second resistors 21, 22 have equal resistances. The output (b) is disposed at a junction of the first and second resistors 21, 22.

The comparator unit 30 has a first input port 32 connected to the output (b) of the reference voltage generating unit 20, a second input port 33 adapted to be connected to a junction (a) of the first and second power supplying units 11, 12 of the power supplying system and that receives a detected voltage (Vc), and an output port 31.

The comparator unit 30 includes comparator means for comparing the reference voltage (Vb) and the detected voltage (Vc), and path means adapted to connect the junction (a) of the first and second power supplying units 11, 12 to the second input port 33. The path means further connects the output port 31 to the second input port 33. The comparator means includes an operational amplifier 34 having a non-inverting input that serves as the first input port 32, and an inverting input that serves as the second input port 33. The path means includes a first resistor 41 adapted to connect the junction (a) of the first and second power supplying units 11, 12 to the second input port 33, and a second resistor 42 interconnecting the output port 31 and the second input port 33.

The comparator means generates a low logic signal at the output port 31 when the reference voltage (Vb) is less than the detected voltage (Vc), and a high logic signal at the output port 31 when the reference voltage (Vb) is greater than the detected voltage (Vc).

The voltage balancing device of the first preferred embodiment operates as follows:

1. The low logic signal at the output port 31 allows the second power supplying unit 12 to discharge via the path means upon detection by the comparator means that the reference voltage (Vb) is less than the detected voltage (Vc) until the reference voltage (Vb) and the detected voltage (Vc) become equal, indicating a condition in that voltage outputs of the first and second power supplying units 11, 12 have become balanced.

2. The high logic signal at the output port 31 enables the supply of discharge current to the first power supplying unit 11 via the path means so as to be adapted to allow the second power supplying unit 12 to discharge slower than the first power supplying unit 11 upon detection by the comparator means that the reference voltage (Vb) is greater than the detected voltage (Vc) until the reference voltage (Vb) and the detected voltage (Vc) become equal, indicating the condition in that the voltage outputs of the first and second power supplying units 11, 12 have become balanced.

Figure 3:
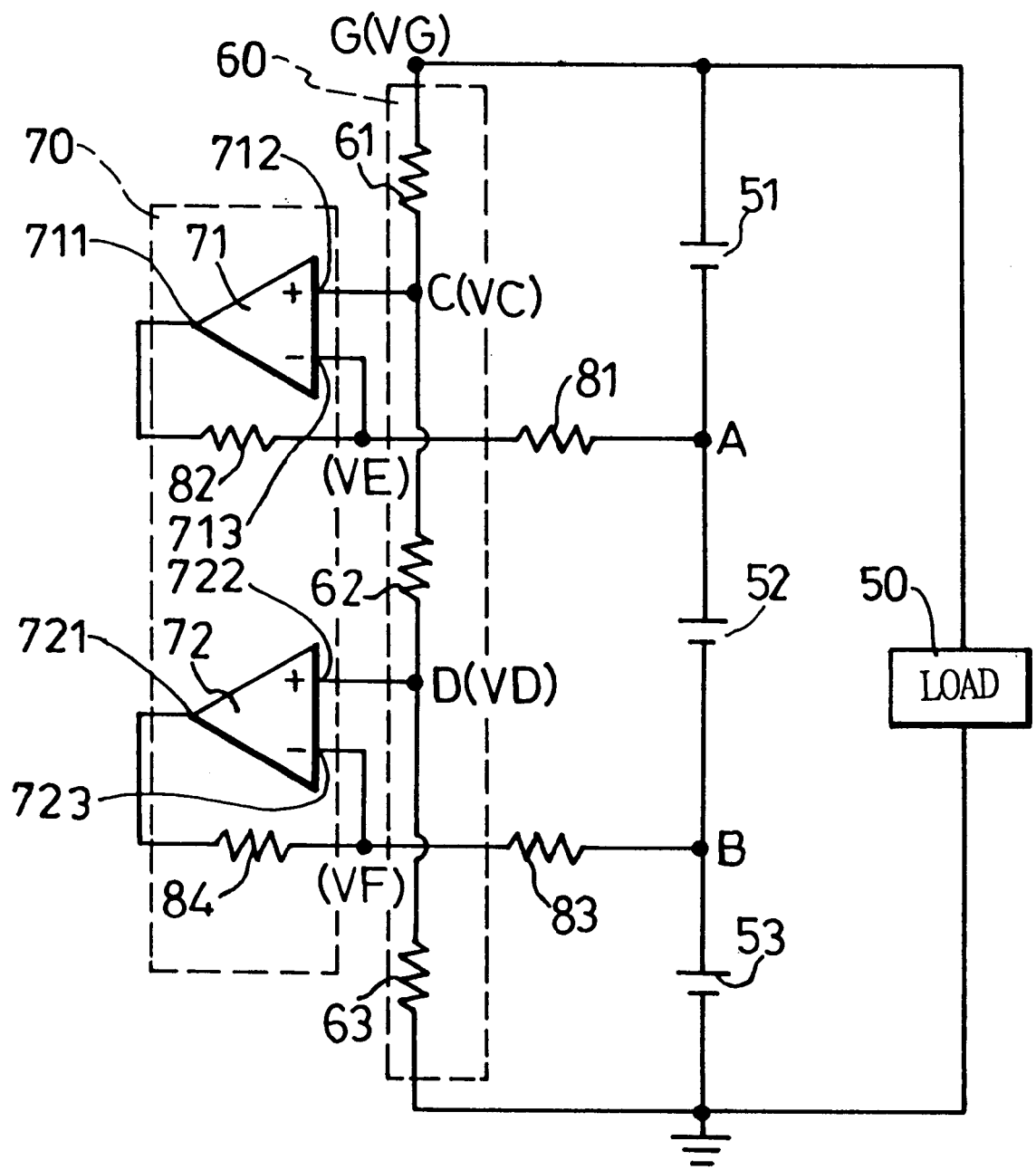
FIG. 3 is a schematic electrical circuit diagram illustrating a power supplying system that incorporates the second preferred embodiment of a voltage balancing device according to the present invention.

Referring to FIG. 3, the second preferred embodiment of a voltage balancing device according to the present invention is shown to be installed in a dc power supplying system that provides power to an electrical load 50. The power supplying system includes first, second, and third power supplying units 51, 52, and 53 that are connected in series to supply power concurrently to operate an electrical load 50. The first power supplying unit 51 has a negative terminal and a positive terminal to be connected to the electrical load 10. The second power supplying 52 has a positive terminal to be connected to the negative terminal of the first power supplying unit 51. The third power supplying unit 53 has a positive terminal connected to the negative terminal of the second power supplying unit 52, and a negative terminal to be connected to a ground. The voltage balancing device comprises a reference voltage generating unit 60 and a comparator unit 70.

The reference voltage generating unit 60 is adapted to be connected in parallel to the power supplying system, and has first and second outputs (C), (D) that provide first and second reference voltages (VC), (VD), respectively. The reference voltage generating unit 60 includes first, second, and third resistors 61, 62, and 63 connected in series across the power supplying system. The first, second, and third resistors 61, 62, and 63 have equal resistances. The first output (C) is disposed at a junction of the first and second resistors 61, 62. The second output (D) is disposed at a junction of the second and the third resistors 62, 63.

The comparator unit 70 has first and second output ports 711, 721, and first, second, third, and fourth input ports 712, 713, 722, and 723. The first input port 712 is connected to the first output (C) of the reference voltage generating unit 60. The second input port 713 is adapted to be connected to a junction (A) of the first and second power supplying units 51, 52 of the power supplying system and receives a first detected voltage (VE). The third input port 722 is connected to the second output (D) of the reference voltage generating unit 60. The second input port 723 is adapted to be connected to a junction (B) of the second and third power supplying units 52, 53 of the power supplying system and receives a second detected voltage (VF) therefrom.

The comparator unit 70 includes comparator means for comparing the first and second reference voltages (VC), (VD) with the first and second detected voltages (VE), (VF), and first and second path means. The first path means is adapted to connect the junction (A) of the first and second power supplying units 51, 52 to the second input port 713. The first path means further connects the first output port 711 to the second input port 713. The second path means is adapted to connect the junction (B) of the second and third power supplying units 52, 53 to the fourth input port 723. The second path means further connects the second output port 721 to the fourth input port 723.

The comparator means includes first and second operational amplifiers 71, 72. The first operational amplifier 71 has a non-inverting input that serves as the first input port 712, and an inverting input that serves as the second input port 713. The second operational amplifier 72 has a non-inverting input that serves as the third input port 722, and an inverting input that serves as the fourth input port 723.

The first path means includes a first resistor 81 adapted to connect the junction (A) of the first and second power supplying units 51, 52 to the second input port 713, and a second resistor 82 interconnecting the first output port 711 and the second input port 713. The second path means includes a third resistor 83 adapted to connect the junction (B) of the second and third power supplying units 52, 53 to the fourth input port 723, and fourth resistor 84 interconnecting the second output port 721 and the fourth input port 723.

According to the first operational amplifier 71, the comparator means generates a low logic signal at the first output port 711 when the first reference voltage (VC) is less than the first detected voltage (VE), and a high logic signal at the first output port 711 when the first reference voltage (VC) is greater than the first detected voltage (VE). According to the second operational amplifier 72, the comparator means generates a low logic signal at the second output port 721 when the second reference voltage (VD) is less than the second detected voltage (VF), and a high logic signal at the second output port 721 when the second reference voltage (VD) is greater than the second detected voltage (VF).

The voltage balancing device of the second preferred embodiment operates as follows:

1. The low logic signal at the first output port 711 allows the second power supplying unit 52 to discharge via the first path means upon detection by the comparator means that the first reference voltage (VC) is less than the first detected voltage (VE) until the first reference voltage (VC) and the first detected voltage (VE) become equal, indicating a condition in that voltage outputs of the first power supplying unit 51 and the second power supplying unit 52 in combination with the third power supplying unit 53 have become balanced.

The low logic signal at the second output port 721 allows the third power supplying unit 53 to discharge via the second path means upon detection by the comparator means that the second reference voltage (VD) is less than the second detected voltage (VF) until the second reference voltage (VD) and the second detected voltage (VF) become equal, indicating a condition in that voltage outputs of the third power supplying unit 53 and the first power supplying unit 51 in combination with the second power supplying unit 52 have become balanced.

2. The high logic signal at the first output port 711 enables the supply of discharge current to the first power supplying unit 51 via the first path means so as to be adapted to allow the second power supplying unit 52 in combination with the third power supplying unit 53 to discharge slower than the first power supplying unit 51 upon detection by the comparator means that the first reference voltage (VC) is greater than the first detected voltage (VE) until the first reference voltage (VC) and the first detected voltage (VE) become equal, indicating the condition in that the voltage outputs of the first power supplying unit 51 and the second power supplying unit 52 in combination with the third power supplying unit 53 have become balanced.

The high logic signal at the second output port 721 enables the supply of discharge current to the second power supplying unit 52 via the second path means so as to be adapted to allow the third power supplying unit 53 to discharge slower than the first and second power supplying units 51, 52 upon detection by the comparator means that the second reference voltage (VD) is greater than the second detected voltage (VF) until the second reference voltage (VD) and the second detected voltage (VF) become equal, indicating the condition in that the voltage outputs of the third power supplying unit 53 and the combination of the first and second power supplying units 51, 52 have become balanced.

According to above construction, when a dc power supplying system includes two or more power supplying units connected in series to supply power concurrently to operate an electrical load, the voltage balancing device of this invention is adapted to allow the power supplying unit with a higher voltage output to discharge so as to control that voltage outputs of the power supplying units to become balanced and extend the service life of the power supplying units.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A voltage balancing device for a direct current power supplying system which includes at least first and second power supplying units that are connected in series to supply power concurrently to operate an electrical load, the first power supplying unit having a negative terminal and a positive terminal to be connected to the electrical load, the second power supplying unit having a positive terminal connected to the negative terminal of the first power supplying unit, and a negative terminal to be connected to a ground, said voltage balancing device comprising:

a reference voltage generating unit adapted to be connected in parallel to the power supplying system and having an output that provides a reference voltage; and a comparator unit having a first input port connected to said output of said reference voltage generating unit, a second input port adapted to be connected to a junction of the first and second power supplying units of the power supplying system so as to receive a detected voltage therefrom, and an output port;

said comparator unit including comparator means for comparing said reference voltage and the detected voltage, and path means adapted to connect the junction of the first and second power supplying units to said second input port, said path means further connecting said output port to said second input port;

said comparator unit being adapted to allow the second power supplying unit to discharge via said path means upon detection by said comparator means that said reference voltage is less than the detected voltage until said reference voltage and the detected voltage become equal, indicating a condition in that voltage outputs of the first and second power supplying units have become balanced;

said comparator means being adapted to supply discharge current to the first power supplying unit via said path means so as to be adapted to allow the second power supplying unit to discharge slower than the first power supplying unit upon detection by said comparator means that said reference voltage is greater than the detected voltage until said reference voltage and the detected voltage become equal, indicating the condition in that the voltage outputs of the first and second power supplying units have become balanced.

2. The voltage balancing device as claimed in claim 1, wherein said reference voltage generating unit includes first and second resistors connected in series across the power supplying system, said output being disposed at a junction of said first and second resistors.

3. The voltage balancing device as claimed in claim 2, wherein said first and second resistors have equal resistances.

4. The voltage balancing device as claimed in claim 1, wherein said comparing means includes an operational amplifier having a non-inverting input that serves as said first input port, and an inverting input that serves as said second input port.

5. The voltage balancing device as claimed in claim 4, wherein said path means includes a resistor adapted to connect the junction of the first and second power supplying units to said second input port.

6. The voltage balancing device as claimed in claim 4, wherein said path means includes a resistor interconnecting said output port and said second input port.

7. The voltage balancing device as claimed in claim 4, wherein said path means includes a first resistor adapted to connect the junction of the first and second power supplying units to said second input port, and a second resistor interconnecting said output port and said second input port.

8. The voltage balancing device as claimed in claim 7, wherein said comparing means generates a low logic signal at said output port when said reference voltage is less than the detected voltage, and a high logic signal at said output port when said reference voltage is greater than the detected voltage.

* * * * *